UNITED STATES PATENT OFFICE.

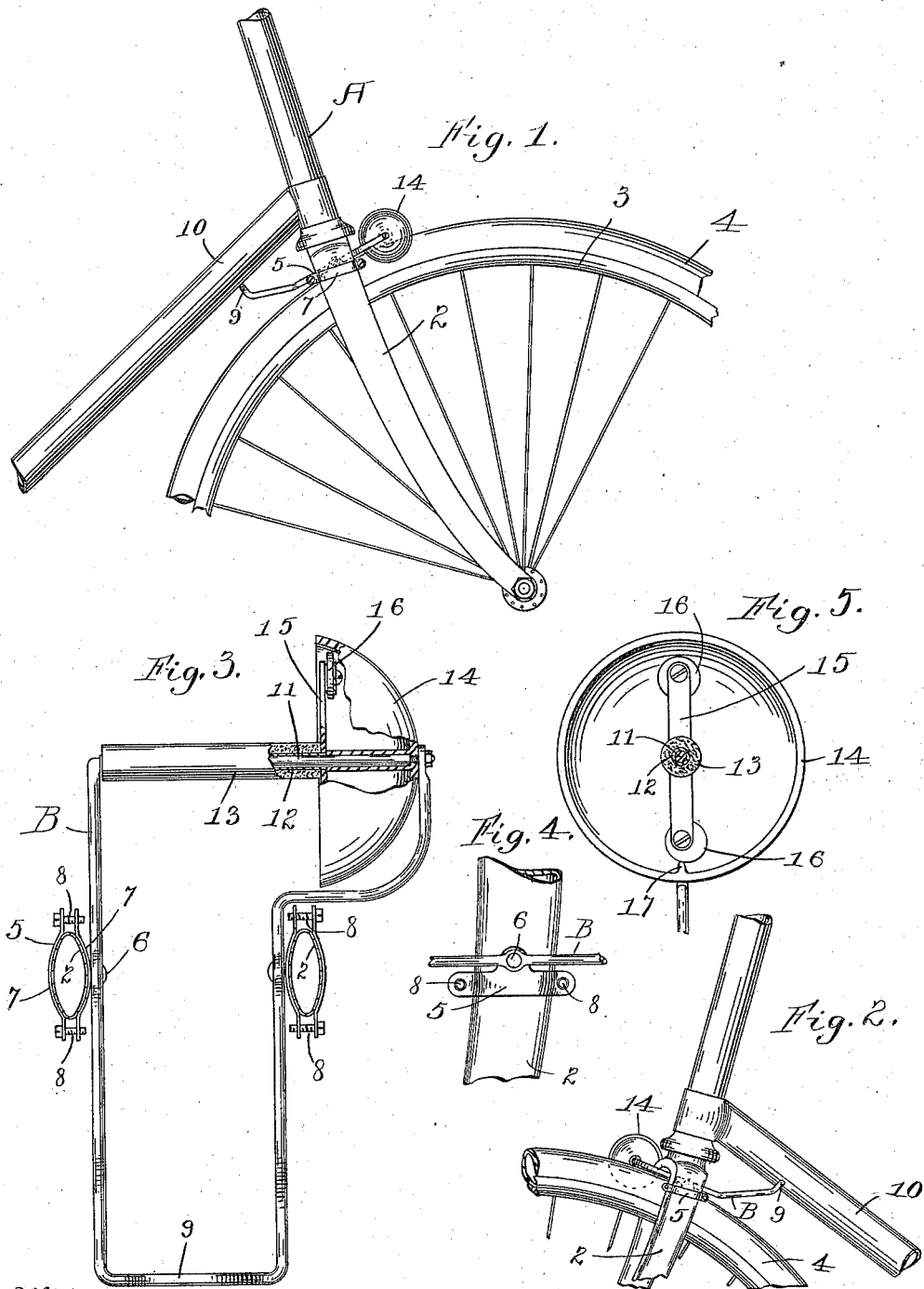

JOSEPH K. COLE AND ROBERT COLE, OF ST. PAUL, MINNESOTA.

BICYCLE-BELL.

SPECIFICATION forming part of Letters Patent No. 576,257, dated February 2, 1897.

Application filed June 12, 1896. Serial No. 595,341. (No model.)

*To all whom it may concern:*

Be it known that we, JOSEPH K. COLE and ROBERT COLE, of St. Paul, Ramsey county, Minnesota, have invented certain Improvements in Automatic Bicycle-Bells, of which the following is a specification.

Our invention relates to improvements in bicycle-bells, its object being to provide an improved form thereof adapted to be automatically actuated by the rotating of the forward wheel of the bicycle when the same is turned at an angle with the frame, the purpose being to provide a bell which will be automatically actuated only in the sharp turning of corners or in turning out of the way of vehicles and persons.

Our invention further consists in the specific construction hereinafter more particularly described and claimed.

In the accompanying drawings, forming part of this specification, Figure 1 is a partial side view of the forward end of a bicycle, illustrating our invention applied to the front fork. Fig. 2 is a similar view showing the wheel turned at a sufficient angle with the frame to bring the bell mechanism into operative engagement with the wheel. Fig. 3 is a plan view of our invention. Fig. 4 is a side view of a portion of one member of the front fork of a bicycle, showing the manner of connecting our invention thereto; and Fig. 5 is a partial view of the bell mechanism, looking toward the bell.

In the drawings, A represents the bicycle-frame, and 2 the front fork members, in the lower end of which is journaled the wheel 3, provided with the ordinary tire 4.

Our invention consists of the frame B, secured to the fork members 2 by means of clips or clamps 5. These clips have each a pivotal connection 6 to the adjacent side of the frame B and are made up of two similar members 7, shaped to fit the opposite sides of the fork member, being secured in place thereon by means of the connecting-bolts 8. The frame B thus turns upon the pivots 6, as hereinafter described in the operation of the device. The rear end of the frame B is formed with a central upward bend 9, which rests against the under side of the bicycle-tubing 10 when the wheel 3 is in line with the frame. The forward end of the frame B is formed with a transverse rod 11, upon which loosely turns the sleeve 12, provided with a sleeve 13, of rubber or similar material. Upon the end of the rod 11 is secured the bell 14, which is adapted to be rung by the rotating of the bar 15, secured upon the end of the sleeve 12 inside the bell. The bar 15 has secured upon its ends the rolls 16, which are adapted to strike against a projection 17 upon the inner surface of the bell as the bar is rotated to sound an alarm, this being an ordinary construction of bell. In order to prevent the bend 9 of the bell-frame from injuring the enamel of the bicycle-tubing, we generally cover this bend with rubber or similar material.

With our invention secured in place, as shown in Fig. 1, the bend 9 rests against the tubing 10 of the bicycle, holding the opposite end of the frame B supported above the tire. As the wheel 3 is turned, as shown in Fig. 2, the bend 9 moves out of contact with the bicycle-tubing, allowing the opposite end of the frame carrying the sleeve 13 to drop into contact with the tire. The rotation of the wheel then rapidly rotates the sleeve 13 and the connected bar 15, ringing the bell. When the wheel is again turned to a straight line, the bend 9 is engaged by the bicycle-frame, so as to lift the sleeve 13 out of contact with the tire. The bell is thus actuated whenever and as long as the wheel 3 is turned sufficiently out of line with the frame to allow the sleeve 13 to be engaged by the tire.

We claim—

1. The combination with the bicycle and its front fork, of the bell-carrying attachment pivoted to said fork adjacent the tire of the wheel, said attachment being engaged by the bicycle-frame so as to be held out of contact with the tire when the wheel is in line with the bicycle-frame, and the bell-actuating means adapted to be engaged by the tire to sound an alarm when the wheel is turned at an angle with the frame.

2. The combination with the bicycle-frame, of the bell-carrying attachment pivoted thereto adjacent the forward wheel, said attachment being engaged by the frame when the wheel is in line therewith, to hold it tilted away from the wheel, and the bell-actuating means adapted to be engaged by the wheel, and to be operated by the rotating thereof, when the same is turned at an angle with the frame.

3. The combination with the front fork of a bicycle and the wheel journaled therein, of the bell-carrying attachment pivotally secured to said fork adjacent the wheel-tire, being normally engaged by the frame and thereby held out of contact with the tire, but adapted to drop into contact with the tire when the wheel is turned out of line with the frame, and to be actuated by rotation thereof to sound an alarm.

4. The combination with the front fork of a bicycle, of the bell-carrying attachment pivoted thereto, its bell and connected roll, the means adapted to be engaged by the bicycle-tubing to hold said roll out of contact with the tire when the forward wheel is in line with the frame, but adapted to be released from the frame to allow said roll to bear against the tire and actuate the bell when the wheel is turned out of line with the frame.

In testimony whereof we affix our signatures in presence of two witnesses.

JOSEPH K. COLE.
ROBERT COLE.

Witnesses:
H. S. JOHNSON,
F. G. BOODBURG.